United States Patent
Krishnaswamy et al.

(10) Patent No.: US 7,696,280 B2
(45) Date of Patent: Apr. 13, 2010

(54) HDPE RESINS FOR USE IN PRESSURE PIPE AND RELATED APPLICATIONS

(75) Inventors: Rajendra K. Krishnaswamy, Bartlesville, OK (US); Qing Yang, Bartlesville, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 56 days.

(21) Appl. No.: 10/835,755

(22) Filed: Apr. 30, 2004

(65) Prior Publication Data

US 2005/0245689 A1 Nov. 3, 2005

(51) Int. Cl.
 C08L 23/08 (2006.01)
 C08L 23/00 (2006.01)
(52) U.S. Cl. ...................... 525/240; 525/191
(58) Field of Classification Search ................ 525/191, 525/240; 526/111
 See application file for complete search history.

(56) References Cited

U.S. PATENT DOCUMENTS

| | | | |
|---|---|---|---|
| 4,438,238 A * | 3/1984 | Fukushima et al. | ......... 525/240 |
| 4,461,873 A | 7/1984 | Bailey et al. | |
| 4,547,551 A | 10/1985 | Bailey et al. | |
| 5,744,666 A | 4/1998 | Welch et al. | |
| 6,025,512 A | 2/2000 | Crowther et al. | |
| 6,114,477 A | 9/2000 | Merrill et al. | |
| 6,120,887 A | 9/2000 | Werenicz et al. | |
| 6,175,027 B1 | 1/2001 | Sullivan et al. | |
| 6,187,880 B1 | 2/2001 | Welch et al. | |
| 6,291,382 B1 | 9/2001 | Koppl et al. | |
| 6,534,665 B1 | 3/2003 | Nunez et al. | |
| 6,632,680 B1 * | 10/2003 | DesLauriers et al. | .......... 436/85 |
| 6,649,698 B1 | 11/2003 | Mehta | |
| 6,878,784 B1 | 4/2005 | Asumalahti | |
| 2003/0199648 A1 * | 10/2003 | McDaniel et al. | ........... 526/111 |
| 2004/0054088 A1 | 3/2004 | Kazakov et al. | |

FOREIGN PATENT DOCUMENTS

| | | | |
|---|---|---|---|
| EP | 0 100 843 A1 | | 2/1984 |
| EP | 1 201 713 A1 | | 5/2002 |
| EP | 1 359 192 A1 | | 11/2003 |
| WO | WO 01/25328 | * | 4/2001 |
| WO | WO 03/099922 A1 | | 12/2003 |
| WO | WO2004/048468 A1 | | 6/2004 |

OTHER PUBLICATIONS

International Search Report and Written Opinion, PCT/2005/014877, Aug. 17, 2005, 13 pages.

* cited by examiner

Primary Examiner—James Seidleck
Assistant Examiner—Saira Haider
(74) Attorney, Agent, or Firm—Merchant & Gould

(57) ABSTRACT

The present invention provides bimodal polyethylene resins in which the high molecular weight ethylene copolymer component typically has a relatively narrow molecular weight distribution, with short chain branching content being substantially constant across its molecular weight distribution. The resins of this invention are typically characterized by improved toughness and resistance to slow crack propagation properties making them useful for pressure pipe applications.

43 Claims, 5 Drawing Sheets

HDPE RESINS FOR USE IN PRESSURE PIPE AND RELATED APPLICATIONS

TECHNICAL FIELD OF THE INVENTION

This invention relates to the field of polyolefin compositions, methods for producing polyolefin compositions, articles of manufacture using polyolefin compositions, and processes for producing articles of manufacture using polyolefin compositions.

BACKGROUND OF THE INVENTION

Polyethylene (PE) is consumed in the USA at the rate of over ten million metric tons every year. The semi-crystalline nature of polyethylene makes it a material of choice for many commodity and specialty applications. Crystallinity offers many desirable features to PE such as stiffness, strength, barrier to gas transport, chemical resistance, and dimensional stability. The non-crystalline phase can impart such attributes as toughness and resistance to slow crack growth.

Presently, a variety of PE resins can be used to produce high stiffness pipe used in water, gas, and other fluid transport applications. Polyethylene pipe classified as PE-100, MRS 10, or ASTM D3350 typical cell classification 345566C is especially desirable for use under conditions requiring higher pressure ratings. To obtain a PE-100 classification, PE-100 pipe is required to meet certain standards specifying stiffness, resistance to slow crack growth, resistance to chemical attack, and low-temperature toughness (expressed as rapid crack propagation). Further, such pipe must meet a deformation standard which is determined under pressure at elevated temperatures. Resin which can be employed to produce both small diameter (1 inch to 12 inches in diameter) and large diameter (greater than 12 inches in diameter) PE-100 pipe is described in U.S. Patent Application Pub. No. 2003/0199648 A1 (U.S. patent application Ser. No. 10/373,648), published Oct. 23, 2003, which is incorporated herein by reference in its entirety.

It is also desirable for PE-100 pipe to exhibit toughness. This characteristic can be important in many polyethylene pipe applications, such as, where the pipe is buried underground or where the pipe is used to transport coarse or abrasive slurries. Accordingly, there is a need for a resin and a PE-100 pipe made therefrom which has improved physical properties and impact resistance properties.

SUMMARY OF THE INVENTION

This invention relates to polyolefin compositions, methods for producing polyolefin compositions, articles of manufacture using polyolefin compositions, and processes for producing pipe and other articles of manufacture using polyolefin compositions. More specifically, this invention relates to the production of PE-100 classification polyethylene pipe and the resin used to make such pipe which have improved toughness.

This invention encompasses polyethylene resins, high density polyethylene resins, methods of making and using polyethylene resins, articles of manufacture using polyethylene compositions, and processes for producing articles of manufacture using polyethylene compositions. In the course of examining polymer blends, a high performance polymer composition was developed that provides a useful combination of properties such as polydispersity, short chain branch distribution, long chain branching, rheological properties, and the like, as indicated by measures such as Charpy impact toughness and high-stress PENT slow crack growth resistance values. For example, the resins of the present invention exhibit processing characteristics and properties which are suitable for, among other uses, pressure pipe applications.

In one aspect, the present invention provides a blend of two different polyethylenes such that the blend satisfies some criteria to qualify as PE100 HDPE resins. The component polyethylenes of this invention can be typically produced by using Ziegler-Natta-type or metallocene-type catalysts using either a Series or a parallel reactor approach. The polymer composition comprising a polymer blend can be prepared in any method known in the art, including, but not limited to, blending two different ethylene polymers, or making the polymers catalytically using either a Series or a parallel reactor approach. Typically, the current commercial approach to produce PE100 resins includes blending two broad molecular weight distribution (MWD) polyethylenes characterized by differing molecular weights and short-chain branching (SCB) contents.

In another aspect, this invention provides a polymer composition comprising a high molecular weight component comprising an ethylene copolymer having a substantially uniform short-chain branching (SCB) distribution across its MWD, with a low molecular weight component comprising an ethylene homopolymer or copolymer.

Another aspect of this invention is a composition comprising:

a) a high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from about 4 to about 8; and b) a low molecular weight component comprising an ethylene homopolymer or copolymer characterized by a $M_w$ from about 15 to about 75 kg/mol.

In one aspect, the ethylene homopolymer or copolymer of the low and high molecular weight components are characterized by low levels of rheologically significant long branches. Typically, the composition can comprise from about 45 to about 75 parts by weight high molecular weight component and from about 55 to about 25 parts by weight low molecular weight component. Further, the ethylene copolymer of the high molecular weight component can be further characterized by a $M_w$ molecular weight range from about 250 to about 1,000 kg/mol. In another aspect, the number of short-chain branches (SCB) per 1000 backbone carbon atoms can be from about 5 to about 7.

Still another aspect of this invention is a polymer composition wherein the Razor-Notched Room-Temperature Charpy Energy and the High-Stress PENT (standard PENT using a 3.8 MPa initial loading) for the polymer blend compositions indicate exceptional performance. In this aspect, for example, the composition can be characterized by a room temperature Charpy impact toughness greater than about 1.5 J, and a density greater than or equal to about 0.94 g/cc. In another aspect, the composition can be characterized by a room temperature Charpy impact toughness greater than about 2 J, and a density greater than or equal to about 0.94 g/cc. The polymer blend composition of this invention can also be characterized by a high-stress PENT slow crack growth resistance value at a 3.8 MPa initial loading greater than or equal to about 1000 hours, greater than or equal to about 3000 hours, greater than or equal to about 5000 hours, or greater than or equal to about 6000 hours.

In yet another aspect, this invention provides an article comprising a composition, wherein the composition comprises:

a) a high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from about 4 to about 8; and b) a low molecular weight component comprising an ethylene homopolymer or copolymer characterized by a $M_w$ from about 15 to about 75 kg/mol.

In this aspect, the article can be a pipe, a container, a utensil, a film, a film product, a drum, a fuel tank, a geomembrane, a liner, or the like. Further, the article can comprise a PE-100 pipe.

This invention further provides a method of making a PE-100 pipe comprising extruding the polymer composition disclosed herein in a molten state through a die to form the PE-100 pipe and cooling the pipe.

In addition, this invention provides a method of making a composition comprising combining:

a) from about 45 to about 75 parts by weight high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from about 4 to about 8; and b) from about 55 to about 25 parts by weight low molecular weight component comprising an ethylene homopolymer or copolymer characterized by a $M_w$ from about 15 to about 75 kg/mol.

Further, the present invention provides a process to make a polymer film comprising extruding a fluid polymer composition, wherein the composition is as disclosed herein.

These and other features, aspects, embodiments, and advantages of the present invention will become apparent after a review of the following detailed description of the disclosed features.

BRIEF DESCRIPTION OF THE FIGURES

The following is a brief description of the Figures.

DETAILED DESCRIPTION OF THE INVENTION

Figure 1:
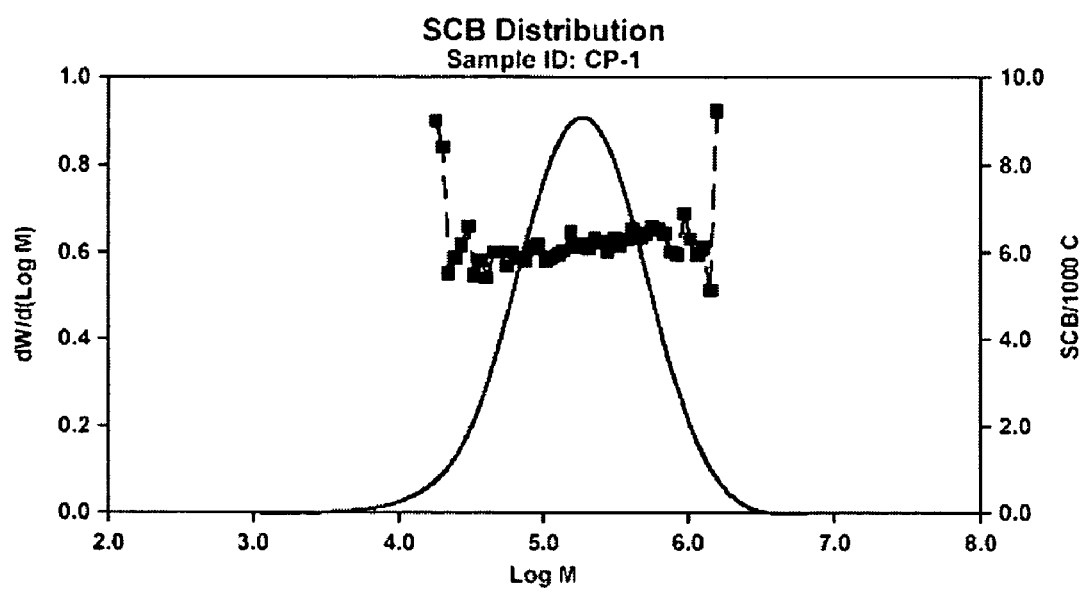
FIG. 1 is a graph illustrating the substantially constant short chain branch distribution across the molecular weight distribution of the CP-1 high molecular weight component resin. This resin is used as the high molecular weight component of the series-2 inventive resins.

The present invention provides polyethylene resin compositions, methods of making and using polyethylene compositions, articles of manufacture using polyethylene compositions, and processes for producing articles of manufacture using polyethylene compositions. Thus, this invention provides polymer compositions characterized by a useful combination of properties such as polydispersity, short chain branch distribution, long chain branching, theological properties, and the like, that afford high performance materials. High performance features can be demonstrated by the improved toughness and resistance to slow crack propagation properties of these resins, which illustrates their utility in pressure pipe applications.

In one aspect, the present invention provides bimodal resins comprising a high molecular weight component and a low molecular weight component. Typically, the high molecular weight component can be characterized by: 1) a relatively narrow molecular weight distribution; 2) a short chain branching distribution that is substantially constant over the molecular weight distribution and 3) the absence of substantial amounts of theologically significant long branches. Typically, the low molecular component comprises low levels of rheologically-significant long branches. The resins of this invention are typically characterized by improved toughness and resistance to slow crack growth properties, as measured by Charpy impact toughness and high-stress PENT. This invention also provides broad molecular weight distribution resins in which short chain branching (SCB) has been substantially isolated in the high molecular weight end of the distribution, and short chain branching distribution is substantially constant over the high molecular weight end.

The bimodal resins of the present invention, as well as the broad molecular weight resins in which SCB has been substantially isolated in the high molecular weight end can be produced by a variety of processes, including, but not limited to, physical mixing blending of component polymers, polymerization processes using series or multi-zone reactors, polymerization processes using multi-component catalysts, and the like. Accordingly, the compositions of the present invention are not restricted according to any one method of preparing the composition.

Components of the Polymer Composition

The present invention provides bimodal resins comprising a high molecular weight component and a low molecular weight component. Further, this invention also provides broad molecular weight distribution (MWD) resins in which the features disclosed herein for the high molecular weight component of a bimodal resin are found in the high molecular weight end of the broad MWD. Thus, any properties, features, or characteristics attributed to the high molecular weight component of a bimodal resin of this invention also describe and can be attributed to the high molecular weight end of the MWD of any broad molecular weight distribution resin of this invention.

The molecular weight characteristics of some representative blend components used herein are provided in Table 2. Their SCB content (from 1-hexene co-monomer) estimated using NMR is also listed in the same table. The HP-1 and HP-2 resins are narrow-MWD, high-molecular weight homopolymers, with the molecular weight of HP-2 being considerably higher than that of HP-1. The CP-1 resin is a narrow-MWD, high-molecular weight copolymer with about 5.6 SCB/1000 backbone carbons. The molecular weight and MWD of CP-1 and HP-1 are similar, however they differ in their SCB content. The LCP-1 and 516-2 resins are low molecular weight blend components, with LCP-1 being a copolymer. The average SCB content in CP-1 and LCP-1 were verified to be substantially constant across their entire MWD using a recently-developed sequential SEC-FTIR technique (See: P. J. DesLauriers, D. C. Rohlfing and E. T. Hsieh, *Polymer*, 43, 159 (2002); which is incorporated herein by reference in its entirety.) Thus, the average SCB content in CP-1 and LCP-1 is approximately constant across their MWD.

High Molecular Weight Component. In one aspect, this invention can provide a composition comprising:

a) a high molecular weight component comprising an ethylene copolymer characterized by a $M_w/M_n$ (polydispersity index or PDI) less than or equal to about 3.5, a substantially constant short-chain branching (SCB) profile across the molecular weight distribution, and a number of short-chain branches (SCB) per 1000 backbone carbon atoms from about 4 to about 8; and b) a low molecular weight component comprising an ethylene homopolymer or copolymer characterized by a $M_w$ from about 15 to about 75 kg/mol. Thus, in this aspect, the high molecular weight component can be typically characterized by: 1) a relatively narrow molecular weight distribution; 2) a short chain branching distribution that is substantially constant over the molecular weight distribution; 3) the absence of rheologically significant long branches. Table 2 provides characterization data for some representative individual high molecular weight polymer components used to prepare both inventive and comparative polymer blends of the present invention. High molecular weight components listed in Table 2 are CP-1, HP-1, HP-2, and 516-1.

In another aspect, the high molecular weight component polymers of this invention are characterized by having low levels of rheologically significant long branches, meaning that the ratio of the zero shear viscosity ($\eta_0$, in Pa-sec) to the weight average molecular weight ($M_w$, in kg/mol) is typically less than or equal to about 1,500 Pa-sec/kg/mol. This ratio of $\eta_0$ to $M_w$ can also be less than about 1,000 Pa-sec/kg/mol, and in another aspect, can be less than about 700 Pa sec/kg/mol.

In still another aspect of this invention, the high molecular weight component polymers of this invention are characterized by having low levels of rheologically significant long branches, meaning that the ratio of the zero shear viscosity ($\eta_0$, in Pa-sec) to the weight average molecular weight ($M_w$, in kg/mol) is from about 100 to about 1,500 Pa-sec/kg/mol. This ratio of $\eta_0$ to $M_w$ can also be from about 200 to about 1,000 Pa-sec/kg/mol, or from about 300 to about 700 Pa-sec/kg/mol.

In another aspect, one feature of the inventive polymers provided in the Examples and the Tables is that, among other things, the high molecular weight component is typically prepared using a metallocene catalyst and its short chain branching distribution is substantially constant across its MWD. In comparison, the high molecular weight component of the H516B resin (516-1) is prepared using a classic Ziegler-Natta catalyst and its SCB distribution is heterogeneous across its MWD.

The relatively narrow molecular weight distribution of the high molecular weight component can be seen in its low polydispersity index. Thus, the high molecular weight component of the present invention can comprise an ethylene copolymer characterized by an $M_w/M_n$ less than or equal to about 3.5. In yet another aspect, the high molecular weight component can comprise an ethylene copolymer characterized by an $M_w/M_n$ less than or equal to about 3.3, or less than or equal to about 3.1. In comparison, the polydispersity index of 516-1 is measured to be 4.5.

This invention also provides a high molecular weight component comprising an ethylene copolymer characterized by, in one aspect, an $M_z/M_w$ less than or equal to about 3. In another aspect, the ethylene copolymer can be characterized by an $M_z/M_w$ less than or equal to about 2.7, or an $M_z/M_w$ less than or equal to about 2.5.

The short chain branching distribution that is substantially constant over the molecular weight distribution, typically, for example, in an $M_w$ molecular weight range from about 250 to about 1,000 kg/mol, as determined experimentally, is seen in FIG. 1 for the CP-1 high molecular weight component. FIG. 1 indicates that the polymers of the high molecular weight component of this invention have a flat or substantially flat short chain branching profile across its molecular weight distribution. This feature indicates that short chain branching of the polymers of the present invention remains substantially constant across the relatively narrow range of molecular weights. In one aspect, the term substantially constant is typically used herein to refer to the range of short-chain branches (SCB) per 1000 backbone carbons can vary over a total range of less than or equal to about 1 SCB/1000C across the molecular weight profile. That is, the variation in the range of short-chain branches (SCB) per 1000 backbone carbons can typically vary plus or minus about 0.5 SCB/1000C from the average SCB content across its molecular weight profile, for a total range of less than or equal to about 1 SCB/1000C across the molecular weight profile of the polymer. For the high molecular weight components of the present invention, the variation in the range of short-chain branches (SCB) per 1000 backbone carbons can also vary plus or minus about 0.4 SCB/1000C from the average SCB content across its molecular weight profile, for a total range of less than or equal to about 0.8 SCB/1000C. In still another aspect, the high molecular weight component of the present invention can comprise an ethylene copolymer characterized by a number of short-chain branches (SCB) from about 4 to about 8 short-chain branches (SCB) per 1000 backbone carbons. Thus, the number of SCB/1000C is a different parameter or measurement than the substantially constant nature of the number of SCB/1000C. In this aspect, the SCB can also be from about 4.5 to about 7.5 SCB/1000C, from about 5 to about 7 SCB/1000C, or about 6 SCB/1000C.

The term high molecular weight component is typically used herein to refer to a polymer characterized by an $M_w$ from about 250 kg/mol to about 1000 kg/mol. In another aspect, the high molecular weight component can be characterized by an $M_w$ from about 275 kg/mol to about 800 kg/mol, or from about 300 kg/mol to about 600 kg/mol.

In another aspect, the high molecular weight component of the present invention can comprise an ethylene copolymer characterized by a $M_w/M_n$ less than or equal to about 3.5, and a number of short-chain branches (SCB) per 1000 backbone carbon atoms from about 4 to about 8 across the MWD, in an $M_w$ molecular weight range from about 250 to about 1,000 kg/mol. The ethylene copolymer can also be characterized by a $M_w/M_n$ less than or equal to about 3.5, and a number of short-chain branches (SCB) per 1000 backbone carbon atoms from about 5 to about 7 across the MWD, typically, in a $M_w$ molecular weight range from about 250 to about 1,000 kg/mol.

The composition of the present invention can comprise from about 45 to about 75 parts by weight high molecular weight component and from about 55 to about 25 parts by weight low molecular weight component, to provide the desired resin properties. Further, the composition of the present invention can also comprise from about 50 to about 60 parts by weight high molecular weight component and from about 50 to about 40 parts by weight low molecular weight component.

In another aspect of this invention, the high molecular weight component can comprise a copolymer of ethylene and another α-olefin (mono-1-olefin), in which the copolymer can have between about 0.001 and about 30 weight percent and wherein the mono-1-olefin can have from 3 to about 12 carbon atoms.

Low Molecular Weight Component. In one aspect, and in addition to the high molecular weight component comprising an ethylene copolymer disclosed herein, the present invention can typically comprise a low molecular weight component comprising an ethylene homopolymer or copolymer, wherein the homopolymer or copolymer can be characterized by an $M_w$ from about 15 to about 75 kg/mol. Further, the low molecular weight component ethylene homopolymer or copolymer can be characterized by an $M_w$ from about 25 to about 60 kg/mol, or an $M_w$ from about 30 to about 50 kg/mol. Table 2 provides characterization data for some representative individual low molecular weight and high molecular weight polymer components used to prepare the polymer blends of the present invention. Low molecular weight components listed in Table 2 are LCP-1 and 516-2.

In another aspect, the low molecular weight component polymers of this invention are characterized by having low levels of rheologically significant long branches, meaning that the ratio of the zero shear viscosity ($\eta_0$, in Pa-sec) to the weight average molecular weight ($M_w$, in kg/mol) is typically less than or equal to about 1,500 Pa-sec/kg/mol. This ratio of $\eta_0$ to $M_w$ can also be less than about 1,000 Pa-sec/kg/mol, and in another aspect, can be less than or equal to about 700 Pa-sec/kg/mol.

In still another aspect of this invention, the low molecular weight component polymers of this invention are characterized by having low levels of rheologically significant long branches, such that the ratio of the zero shear viscosity ($\eta_0$, in Pa-sec) to the weight average molecular weight ($M_w$, in kg/mol) is from about 100 to about 1,500 Pa-sec/kg/mol. The ratio of $\eta_0$ to $M_w$ can also be from about 200 to about 1,000 Pa-sec/kg/mol, or from about 300 to about 700 Pa-sec/kg/mol.

Preparation of the Polymer Blend Components

The present invention provides a composition comprising a high molecular weight component comprising an ethylene copolymer and a low molecular weight component comprising an ethylene homopolymer or copolymer. The polymer blend components can be obtained commercially or can be prepared according to any method known to one of ordinary skill in the art. One method of obtaining the individual components of the catalyst composition is by the catalytic methods employing metallocene-based catalyst systems. Examples of some of these methods are provided herein. However, the composition disclosed herein is independent of how the individual components are prepared or obtained. Further, the composition disclosed herein is independent of any method of making the polymer blend components, or any method of making the polymer blend itself.

Comonomers for the High Molecular Weight Component. In one aspect, the high molecular weight component of the polymer composition of this invention typically comprises a copolymer of ethylene and another olefinic compound having from about 3 to about 12 carbon atoms per molecule and having at least one olefinic double bond. Thus, the high molecular weight copolymer of ethylene typically comprises a major amount of ethylene (>50 mole percent) and a minor amount of comonomer (<50 mole percent), though this is not a requirement. In another aspect, the comonomers that can be copolymerized with ethylene can have from 3 to about 10 carbon atoms per molecule, from 3 to about 8 carbon atoms per molecule, or from about 3 to about 6 carbon atoms per molecule.

In one aspect, acyclic, cyclic, polycyclic, terminal (α), internal, linear, branched, substituted, unsubstituted, functionalized, and non-functionalized olefins may be employed as comonomers in this invention. For example, typical olefins that may be copolymerized with ethylene to form the high molecular weight component of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be copolymerized with ethylene as disclosed herein.

In one aspect, the amount of comonomer introduced into a reactor zone to produce the copolymer is generally from about 0.001 to about 30 weight percent comonomer based on the total weight of the monomer and comonomer. In another aspect, the amount of comonomer can also be from about 0.01 to about 20 weight percent comonomer or from about 0.1 to about 10 weight percent comonomer based on the total weight of the monomer and comonomer. Alternatively, and in another aspect, an amount of comonomer sufficient to give the above-described concentrations of comonomer by weight in the copolymer itself can be used.

In one aspect, the low molecular weight component of the polymer composition of this invention, like the high molecular weight component, can also comprise a copolymer of ethylene and another olefinic compound having from about 3 to about 12 carbon atoms per molecule and having at least one olefinic double bond. In this case, the low molecular weight copolymer of ethylene also typically comprises a major amount of ethylene (>50 mole percent) and a minor amount of comonomer (<50 mole percent), though this is not a requirement. In another aspect, the comonomers that can be copolymerized with ethylene can have from 3 to about 12 carbon atoms per molecule, from 3 to about 10 carbon atoms per molecule, from about 3 to about 8 carbon atoms per molecule, or from about 3 to about 6 carbon atoms per molecule.

Catalytic Preparation of the Polyolefin Components. The polymer composition of this invention comprising a polymer blend can be prepared in any method known in the art, including, but not limited to, blending two different ethylene polymers, or making the polymers catalytically using either a Series or a parallel reactor approach. Typically, the current commercial approach to produce PE100 resins includes blending two broad molecular weight distribution (MWD) polyethylenes characterized by differing molecular weights and short-chain branching (SCB) contents. In one aspect, the high molecular weight ethylene copolymer and the low molecular weight ethylene homopolymer can be obtained from commercial sources, or can be prepared according to methods known to one of ordinary skill in the art.

In another aspect, methods by which the polymers of this invention can be prepared include, but are not limited to, reacting the olefin monomers with a catalyst comprising the contact product of at least one metallocene compound, at least one organoaluminum compound, and at least one chemically-treated solid oxide.

In one aspect, a typical catalyst composition that can be used to prepare the resins of this invention include at least one metallocene compound, at least one organoaluminum compound, and at least one chemically-treated solid oxide, wherein:

a) the metallocene has the formula:

$(X^1)(X^2)(X^3)(X^4)M^1$, wherein $M^1$ is selected from titanium, zirconium, or hafnium;

($X^1$) and ($X^2$) are independently selected from a cyclopentadienyl, an indenyl, a fluorenyl, or a substituted analog thereof;

($X^1$) and ($X^2$) are optionally connected by a substituted or unsubstituted bridging group comprising:

i) one atom selected from carbon, silicon, germanium, or tin, bonded to both ($X^1$) and ($X^2$); or ii) two or more contiguous carbon atoms in a chain, one end of which is bonded to ($X^1$) and the other end of which is bonded to ($X^2$); and ($X^3$), ($X^4$), any substituent on ($X^1$), any substituent on ($X^2$), and any substituent on the optional substituted bridging group are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

b) the organoaluminum compound has the formula:

$Al(X^5)_n(X^6)_{3-n}$, wherein ($X^5$) is a hydrocarbyl having from 1 to about 20 carbon atoms; ($X^6$) is selected from alkoxide or aryloxide, any one of which having from 1 to about 20 carbon atoms, halide, or hydride; and n is a number from 1 to 3, inclusive; and c) the activator-support comprises a solid oxide treated with an electron-withdrawing anion;

wherein the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

Examples of the solid activator-support include, but are not limited to, chlorided alumina, fluorided alumina, sulfated alumina, fluorided silica-alumina, a pillared clay, or a combination thereof.

In another aspect of the invention, the organoaluminum compound comprises a compound of the formula $Al(X^5)_n(X^6)_{3-n}$, wherein ($X^5$) is a hydrocarbyl having from 1 to about 20 carbon atoms; ($X^6$) is selected from alkoxide or aryloxide, any one of which having from 1 to about 20 carbon atoms, halide, or hydride; and n is a number from 1 to 3, inclusive. In another aspect, the organoaluminum compound may be selected from trimethylaluminum, triethylaluminum, tripropylaluminum, diethylaluminum ethoxide, tributylaluminum, disobutylaluminum hydride, triisobutylaluminum, or diethylaluminum chloride. Examples of the organoaluminum compound include, but are not limited to, triethylaluminum (TEA) or triisobutylaluminum (TIBAL).

Examples of catalyst systems that can be used to prepare the high molecular weight component of this invention include, but are not limited to: ($\eta^5$-indenyl)$_2$HfCl$_2$, fluorided silica-alumina, and triisobutylaluminum.

Numerous processes to prepare and use metallocene-based catalyst that can be employed in this invention have been reported. For example, U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,478, 5,705,579, 6,187,880 and 6,509,427 describe such methods, each of which is incorporated by reference herein, in its entirety. Other processes to prepare metallocene compounds that can be employed in this invention have been reported in references such as: Köppl, A. Alt, H. G. *J. Mol. Catal A*. 2001, 165, 23; Kajigaeshi, S.; Kadowaki, T.; Nishida, A.; Fujisaki, S. *The Chemical Society of Japan*, 1986, 59, 97; Alt, H. G.; Jung, M.; Kehr, G. *J. Organomet. Chem.* 1998, 562, 153-181; and Alt, H. G.; Jung, M. *J. Organomet. Chem.* 1998, 568, 87-112; each of which is incorporated by reference herein, in its entirety. The following treatises also describe such methods: Wailes, P. C.; Coutts, R. S. P.; Weigold, H. in Organometallic Chemistry of Titanium, Zironium, and Hafnium, Academic; New York, 1974; Cardin, D. J.; Lappert, M. F.; and Raston, C. L.; Chemistry of Organo-Zirconium and -Hafnium Compounds; Halstead Press; New York, 1986.

Various processes to prepare chemically treated solid oxides (also termed activators or activator-supports) that can be employed in this invention have also been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

Polymerization Processes. Polymerizations to prepare the high molecular weight ethylene copolymer and the low molecular weight homopolymer or copolymer of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor.

In one aspect, a typical polymerization method is a slurry polymerization process (also known as the particle form process), which is well known in the art and is disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, which is also incorporated by reference herein, in its entirety, and those utilized in a plurality of stirred reactors either in series, parallel, or combinations thereof, wherein the reaction conditions are different in the different reactors.

In another aspect, the polymerizations disclosed herein are carried out typically using a slurry polymerization process in a loop reaction zone. Suitable diluents used in slurry polymerization are well known in the art and include hydrocarbons that are liquid under reaction conditions. The term "diluent" as used in this disclosure does not necessarily mean an inert material, as this term is meant to include compounds and compositions that may contribute to the polymerization process. Examples of hydrocarbons that can be used as diluents include, but are not limited to, cyclohexane, isobutane, isobutane, propane, n-pentane, isopentane, neopentane, and n-hexane. Typically, isobutane is used as the diluent in a slurry polymerization. Examples of this polymerization technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system. Such reactors can comprise continuous take-off and direct recycling of catalyst, diluent, and polymer. In general terms, direct recycling comprises the process of recycling a major portion of the liquids back to the reactor without fractionation, after the solids are separated from the liquids in the flash tank. The recycled liquid contains mostly diluent and unreacted monomers, but can also contain oligomers. Generally, continuous processes can comprise the continuous introduction of a monomer, a catalyst, and a diluent into a polymerization reactor and the continuous removal from this reactor of a suspension comprising polymer particles and the diluent.

In one aspect of the invention, the polymerization reactor system can comprise at least one loop slurry reactor. Such reactors are known in the art and can comprise vertical or horizontal loops. Such loops can comprise a single loop or a Series of loops. Multiple loop reactors can comprise both vertical and horizontal loops. The slurry polymerization can be performed in an organic solvent that can disperse the catalyst and polymer. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a Series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, multiple tubular reactors, a combination of loop and gas reactors, a combination of autoclave reactors or solution reactors with gas or loop reactors, a combination of tubular and autoclave reactors, multiple solution reactors, or multiple autoclave reactors, and the like.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene catalysts.

Accordingly, one aspect of this invention is a PE-100 pipe comprising the composition comprising:

a) a high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from about 4 to about 8; and b) from about 55 to about 25 parts by weight low molecular weight component comprising an ethylene homopolymer or copolymer characterized by a $M_w$ from about 15 to about 75 kg/mol.

This invention further encompasses a method of making a PE-100 pipe comprising extruding this composition in a molten state through a die to form and cool the PE-100 pipe. This invention further encompasses a method of making a composition comprising combining:

a) from about 45 to about 75 parts by weight high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from about 4 to about 8; and b) from about 55 to about 25 parts by weight low molecular weight component comprising an ethylene homopolymer or copolymer characterized by a $M_w$ from about 15 to about 75 kg/mol.

The present invention also encompasses a process to make a polymer film comprising extruding an ethylene composition as disclosed herein in a fluid state.

Properties of the Polymer Composition

An examination of the Tables, Figures, and Examples disclosed herein provides a further description of the resin properties of this invention, as follows. To illustrate various aspects of this invention, three sets of two-component blends from various narrow-MWD (molecular weight distribution), linear (low levels of theologically significant long branches) polyethylenes were prepared with multiple compositions in each set of blends. These blends were prepared such that the branching (from 1-hexene co-monomer) was present exclusively on either the high or the low molecular weight blend component. The average branching content in each blend component was verified to be approximately constant across its MWD.

The Tables, Figures, and Examples provided herein further illustrate the bi-modal blends based on narrow-MWD components with substantially homogenous distribution of SCB across its MWD. By selectively blending homopolymers with copolymers, blends were generated that are similar in their MWD and average SCB content, but differ in their SCB profile. Data provided herein demonstrates how selective SCB placement and the SCB distribution profile affects bulk crystallization kinetics, tensile and other physical properties of polyethylene (PE).

Table 1 provides some non-limiting examples of preparation conditions for the individual component polymers of the present invention, including some non-limiting examples of the catalysts, polymerization conditions, and resulting resin properties of this invention. The polymer composition comprising a polymer blend can be prepared in any method known in the art, including, but not limited to, blending two different ethylene polymers, or making the polymers catalytically using either a Series or a parallel reactor approach. It is not necessary that the polymers presented in Table 1 be produced using the metallocene catalysts shown in Table 1.

Table 2 illustrates some representative individual polymer components used to prepare the polymer blends of the present invention, along with some typical physical properties of these polymers. Thus, molecular weight data from size-exclusion chromatography (SEC), showing weight average molecular weight ($M_w$), the ratio of weight average molecular weight ($M_w$) to number average molecular weight ($M_n$), and the ratio of the z-average molecular weight ($M_z$) to the weight average molecular weight ($M_w$) are provided. Table 2 also provides the number of short chain branches per 1000 carbon atoms in the polymer backbone as a measure of the short chain branching content in the blend component. Two measures of the molecular weight distribution, $M_w/M_n$ and $M_z/M_w$, are also provided in Table 2.

Table 3 illustrates some representative polymer blend compositions of the present invention, along with the weight percent of each individual component used to prepare the blend. Polymer blend compositions of comparative blends are also provided in Table 3. The polymer blend compositions labeled as series-2 compositions are the inventive compositions of this invention. Accordingly, the properties of the series-2 blends are compared herein to those of the other blends as well as those of the H516B. The H516B resin is a conventional PE100 pipe grade HDPE produced by Chevron Phillips Chemical Company, which is a blend of two broad MWD, Ziegler-Natta-based polyethylenes. Specifically, H516B is a 54/46 blend (weight ratio) of 516-1, the high molecular weight component, and 516-2, the low molecular weight component.

Table 4 provides some of the molecular weight and shear rheological characteristics of the inventive polymer blends of the present invention and of the comparative polymer blends, including H516B, for comparisons.

Table 5 illustrates representative physical properties of the inventive and comparative polymer blends of the present invention, including H516B, that are pertinent to pressure-pipe applications. As illustrated in Table 5, the Razor-Notched Room-Temperature Charpy Energy and the High-Stress PENT (standard PENT at a 3.8 MPa initial loading) for the polymer blends of the present invention are superior to those of the other blends shown. Further, these performance measures of the polymers of this invention are also superior to those of the H516B resin.

In one aspect, the polymer composition of this invention can be characterized by an $M_w/M_n$ less than or equal to about 30, and a $M_z/M_w$ less than or equal to about 10. The polymer composition of this invention can also be characterized by an $M_w/M_n$ less than or equal to about 18, and an $M_z/M_w$ less than or equal to about 5.

In another aspect, the polymer composition of this invention can be characterized by an $M_w/M_n$ less than or equal to about 30, less than or equal to about 25, less than or equal to about 20, less than or equal to about 15, or less than or equal to about 10. Still another aspect is the polymer composition of this invention that can be characterized by a $M_z/M_w$ less than or equal to about 10, less than or equal to about 7, or less than or equal to about 5.

In one aspect, the polymer composition comprising a polymer blend of this invention is characterized by having low levels of rheologically significant long branches, meaning that the ratio of the zero shear viscosity ($\eta_0$, in Pa-sec) to the weight average molecular weight ($M_w$, in kg/mol) is typically less than or equal to about 1,500 Pa-sec/kg/mol. This ratio of $\eta_0$ to $M_w$ can also be less than about 1,000 Pa-sec/kg/mol, and in another aspect, can be less than about 700 Pa sec/kg/mol.

In another aspect of this invention, the polymer composition comprising a polymer blend of this invention is characterized by having low levels of rheologically significant long branches, meaning that the ratio of the zero shear viscosity ($\eta_0$, in Pa-sec) to the weight average molecular weight ($M_w$, in kg/mol) is from about 100 to about 1,500 Pa-sec/kg/mol. This ratio of $\eta_0$ to $M_w$ can also be from about 200 to about 1,000 Pa-sec/kg/mol, or from about 300 to about 700 Pa-sec/kg/mol.

Another aspect of this invention is the performance features of the composition. Thus, the polymer composition can be characterized by a room temperature Charpy impact toughness greater than about 1.5 J, and a density greater than or equal to about 0.94 g/cc. The room temperature Charpy impact toughness can also be greater than about 2 J, and a density greater than or equal to about 0.94 g/cc. In another aspect, the polymer composition of this invention can be characterized by a high-stress PENT value at a 3.8 MPa initial loading greater than or equal to about 1000 hours. The polymer composition of this invention can also be characterized by a high-stress PENT value at a 3.8 MPa initial loading greater than or equal to about 3000 hours, greater than or equal to about 5000 hours, or greater than or equal to about 6000 hours.

In yet another aspect, the composition of this invention can be characterized by a high-stress PENT value at a 3.8 MPa initial loading greater than or equal to about 6000 hours and a density greater than or equal to about 0.94 g/cc. The composition can also be characterized by a Charpy impact toughness greater than about 2 J, and a high-stress PENT value at a 3.8 MPa initial loading greater than or equal to about 6000 hours.

Another feature or aspect of the composition of this invention is a polymer composition characterized by a zero shear viscosity, $\eta_0$, less than or equal to about $1.5 \times 10^5$ Pa-sec. The zero shear viscosity, $\eta_0$, can also be less than or equal to about $1 \times 10^5$ Pa-sec.

The non-isothermal and isothermal melt-crystallization characteristics of the subject blends were also investigated using Differential Scanning Calorimetry (DSC). The non-isothermal crystallization kinetics of the blends with SCB located on the longer molecules (in the high $M_w$ component) displayed a lower sensitivity to thermal history as compared to those blends with a similar MWD and average SCB content, but with the SCB located on the shorter molecules. The isothermal crystallization exotherms were observed to shift to longer times and broaden with increasing crystallization temperature. For a given degree of undercooling, MWD, average SCB content and total crystallinity, the crystallization kinetics were substantially slower for those polyethylenes with SCB on the longer molecules. Further, the dependence of the crystallization half time on temperature was substantially steeper for those blends with SCB located only on the longer molecules. While not intending to be bound by theory, this observation may suggest that the slope of the half-time versus temperature plots may be used as a crude indicator of SCB profile in polyethylenes. Also, while not intending to be bound by theory, the crystallization results suggested that molecules with SCB behave as though they are much longer; in other words, from a crystallization perspective, molecules with SCB are more sluggish compared to perfectly linear molecules of the same length. Therefore, the crystallization process and hence the ultimate morphology of PE products appears to depend on the SCB distribution profile in addition to the molecular weight, MWD, and total SCB content.

The instantaneous tensile properties (modulus, yield stress and strain) were also observed to depend on crystallinity and were noted to be substantially independent of other factors such as molecular weight, MWD and SCB distribution profile. The ultimate tensile properties (break stress and strain) were also observed to depend strongly on the SCB distribution profile. The location of SCB along the longer molecules allows the ability to sustain substantially higher levels of stress prior to breakage; however, the breakage does occur at lower extensions. Thus, in one aspect of this invention, ultimate tensile properties are a function of the SCB distribution profile, in addition to molecular weight and crystallinity. Further, the onset of tensile strain-hardening occurs at significantly lower extensions for those polyethylenes with SCB preferentially located on the longer chains.

To the extent that any definition or usage provided by any document incorporated herein by reference conflicts with the definition or usage provided herein, the definition or usage provided herein controls.

The term polymer is used herein to mean homopolymers comprising ethylene and copolymers of ethylene and another olefinic comonomer, as the context requires.

The term low levels of rheologically significant long branches is used herein to indicate that the polymer characterized in this manner meets at least one of the following criteria. A first criterion of a polymer with low levels of rheologically significant long branches is that the polymer typically has a ratio of the zero shear viscosity ($\eta_0$, in Pa-sec) to the weight average molecular weight ($M_w$, in kg/mol) of less than or equal to about 1,500 Pa-sec/kg/mol. A second criterion of a polymer with low levels of rheologically significant long branches is that the polymer typically has a Carreau-Yasuda (CY) "a" breadth parameter that satisfies the following equation: $a \geq 0.77 - 0.08(M_z/M_w)$. Therefore, the term "low levels of rheologically significant long branches" can also be used herein to indicate that the polymer is characterized by meeting both these above criteria.

The term "across the molecular weight distribution" is generally used herein to refer to about 90% of the molecules present within the entire molecular weight distribution of the polymer. The term "entire molecular weight distribution" is defined as the limits across which the size exclusion chromatography (SEC) signal (viscosity detector) is detectable. The term "substantially constant" is generally used herein to refer to a variation in the range of short-chain branches (SCB) per 1000 backbone carbons of plus or minus about 0.5 SCB/1000C from the average SCB content across its molecular weight profile. That is, the range of short-chain branches (SCB) per 1000 backbone carbons can typically vary over a total range of less than or equal to about 1 SCB/1000C across the molecular weight profile of the polymer.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substituents. The general structure also encompasses all enantiomers, diastereomers, and other optical isomers whether in enantiomeric or racemic forms, as well as mixtures of stereoisomers, as the context requires.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

General Test Methods

Analysis of the resultant polymers was conducted according to the following procedures. Polymer density was determined in grams per cubic centimeter (g/cc) on a compression molded sample, cooled at about 15° C. per hour, and conditioned at room temperature, about 25° C., for about 40 hours in accordance with ASTM D1505-68 and ASTM D1928, condition C.

High load melt index (HLMI) was determined in grams of polymer per 10 minutes (g/10 min) in accordance with ASTM D1238, Condition 190/21.6, at 190° C. with a 21,600 gram weight.

Melt Index (MI) was determined in grams of polymer per ten minutes in accordance with ASTM D1238, condition 190/2.16, at 190° C. with a 2,160 gram weight.

PENT slow crack growth resistance values were obtained at 80° C. (176° F.) according to ASTM F1473 (2001), with the exception that the initial load was 3.8 MPa, in order to accelerate the test. This 3.8 MPa PENT test may be referred to herein as a "high stress" PENT test.

The Charpy testing was the Razor-Notched Room-Temperature Charpy Energy test carried out according to ASTM F2231.

Molecular weights and molecular weight distributions were obtained using a PL 220 SEC (Size Exclusion Chromatography) high temperature chromatography unit (Polymer Laboratories) with trichlorobenzene (TCB) as the solvent, with a flow rate of 1 mL/minute at a temperature of about 145° C. BHT (2,6-di-tert-butyl-4-methylphenol) at a concentration of 0.5 g/L was used as a stabilizer in the TCB. An injection volume of 200 µL was used with a nominal polymer concentration of 1.5 mg/mL. Dissolution of the sample in stabilized TCB was carried out by heating at about 150° C. for about 5 hours with occasional, gentle agitation. Subsequently, the sample was kept at about 130° C. for approximately 18 hours (over night) after which it was reheated to about 150° C. for about 2 hours prior to injection. The columns used were three PLgel Mixed A LS columns (7.8×300 mm) and were calibrated with a broad linear polyethylene standard (Phillips Marlex® BHB 5003) for which the molecular weight had been determined.

Molecular weight distributions with short chain branching profiles were obtained through size exclusion chromatography using an FTIR detector. Chromatographic conditions are those described above, and the sample injection volume was 500 µL. Samples were introduced to the FTIR detector via a heated transfer line and flow cell (KBr windows, 1 mm optical path, and ca. 70 uL cell volume). The temperatures of the transfer line and flow cell were kept at 143±1° C. and 140±1° C., respectively. Perkin Elmer FTIR spectrophotometer (PE 2000) equipped with a narrow band mercury cadmium telluride (MCT) detector was used in these studies. Further details of the procedure can be found in Polymer 2002:43:159, by DesLauriers, P. J., Rohlfing, D. C., and Hsieh, E. T.

Melt rheology measurements were obtained as follows. Pellet samples were compression molded at 182° C. for a total of three minutes. The samples were allowed to melt at a relatively low pressure for one minute and then subjected to a high molding pressure for an additional two minutes. The molded samples were then quenched in a cold (room temperature) press. 2 mm×25.4 mm diameter disks were stamped out of the molded slabs for rheological characterization.

Small-strain (10%) oscillatory shear measurements were performed on a Rheometrics Scientific, Inc. ARES rheometer using parallel-plate geometry at a temperature of 190° C. The test chamber of the rheometer was blanketed with nitrogen in order to minimize polymer degradation. The rheometer was preheated to the test temperature of the study. Upon sample loading and after oven thermal equilibration, the specimens were squeezed between the plates to a 1.6 mm thickness and the excess was trimmed. A total of 8.0 minutes elapsed between the time the sample was inserted between the plates and the time the frequency sweep (0.03-100 rad/s) was started. The complex viscosity ($\eta^*$) versus frequency ($\omega$) data were then curve fitted using the modified three parameter Carreau-Yasuda (CY) empirical model to obtain the CY parameters viz. zero shear viscosity—$\eta_0$, characteristic relaxation time—$\tau_\eta$, and breadth parameter a.

The simplified Carreau-Yasuda (CY) empirical model is as follows.

$$|\eta*(\omega)| = \frac{\eta_0}{[1 + (\tau_\eta \omega)^a]^{(1-n)/a}},$$

wherein:

$|\eta^*(\omega)|$=magnitude of complex shear viscosity;

$\eta_0$=zero shear viscosity $\tau_\eta$=viscous relaxation time a="breadth" parameter n=fixes the final power law slope, fixed at 2/11; and $\omega$=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

All DSC experiments were performed using a Perkin Elmer Diamond DSC instrument, that was calibrated using zinc and indium standards for all the runs. The sample and reference pans were blanketed with nitrogen during the measurements.

The non-isothermal crystallization data was analyzed using various empirical equations including the Nadkarni model. See: V. M. Nadkarni, N. N. Bulakh and J. P. Jog, *Advances in Polymer Technolog*, 12, 73 (1993); which is incorporated herein by reference in its entirety. This approach provided a procedure for deriving quantitative parameters to characterize the crystallizability of the polymers and their sensitivity to processing conditions, mainly cooling rates. Non-isothermal crystallization data was analyzed in terms of the degree of undercooling $\Delta T_c$ defined as the temperature difference between $T_m$ in the subsequent heating scan and the temperature at the onset of crystallization, $T_b$. The variation of $\Delta T_c$ with cooling rate, $\chi$, is fitted to the following equation:

$$\Delta T_c = P \cdot \chi + \Delta T_c^0$$

where, $\Delta T_c^0$ is the degree of undercooling required in the limit of zero cooling rate and is related to the thermodynamic driving force for nucleation, and the slope, P is a process sensitivity factor that accounts for the kinetic effects.

Sources of Individual Resin Components

General sources and properties of the individual component resins of this invention are as follows. Melt index, molecular weight, and short chain branching (SCB) properties of this copolymer are provided in Table 2. The low molecular weight ethylene homopolymer, designated herein as the 516-2 resin, was prepared at the Chevron Phillips Pasadena Plastics Complex, using conventional Ziegler-Natta catalysts and methods to form a polymer having the properties as provided in Table 2, for example, using the Lynx®-100 catalyst system from Engelhard, along with a triethylaluminum (TEA) as the cocatalyst, and $H_2$ for molecular weight control. The fluff density of the 516-2 resin is maintained to greater than or equal to about 0.965 g/cc, and a MI range from about 80 to about 120 dg/min, typically around 90 dg/min.

Melt index, molecular weight, and short chain branching (SCB) properties of this homopolymer are also provided in Table 2.

The H516B resin used as a comparative example in the Tables and Examples herein is a conventional PE100 pipe grade HDPE produced by Chevron Phillips Chemical Company, which is a blend of two broad MWD, Ziegler-Natta-based polyethylenes. H516B is a 54/46 (weight ratio) blend of a high molecular weight component designated 516-1, and a low molecular weight component, designated 516-2.

The high molecular weight individual component resins of this invention, designated herein as "CP1", "HP1", and "HP2", were prepared according to the Examples herein. The fluorided silica-alumina activator-support that was used to prepare the high molecular weight resins of this invention is disclosed in WO 9960033, which is incorporated by reference in its entirety.

Example 1

Preparation of Representative Polymer Components

All polymerization runs were conducted in a one-gallon (3.785 liter) stainless steel reactor. Table 1 provides some representative examples of preparative conditions for the individual component polymers, both high molecular weight and low molecular weight, of the present invention, including some non-limiting examples of the catalysts, polymerization conditions, and resulting resin properties of this invention.

Two liters of isobutane and alkyl aluminum were used in all the preparations shown in Table 2. The olefin comonomer used to prepare the copolymers, if used, was 1-hexene. The metallocene solution (1 mg/mL) was usually prepared by dissolving 20 mg of metallocene in a mixture of 5 mL of hexene, 5 mL of 15 wt % of TEA and 10 mL of toluene.

A typical polymerization procedure is as follows. The alkyl aluminum, chemically-treated solid oxide, and the metallocene solution were added in that order through a charge port while venting isobutane vapor. The charge port was closed and 2 liters of isobutane were added along with 1-hexene (if comonomer was used). The contents of the reactor were stirred and heated to the desired run temperature, and ethylene was then introduced. Ethylene was fed on demand to maintain the specified pressure for the specified length of the polymerization run, as shown in Table 1. The reactor was maintained at the desired run temperature through the run by an automated heating-cooling system.

Example 2

Molecular Weight, Physical Properties, and Branching Properties of Representative High Molecular Weight and Low Molecular Weight Polymer Components Table 2 illustrates some representative individual polymer components used to prepare the polymer blends of the present invention, along with some typical physical properties of these polymers. Thus, molecular weight data, obtained as provided in the Examples, showing weight average molecular weight ($M_w$), the ratio of weight average molecular weight ($M_w$) to number average molecular weight ($M_n$), and the ratio of the z-average molecular weight ($M_z$) to the weight average molecular weight ($M_w$) are provided.

Table 2 also provides the number of short chain branches per 1000 carbon atoms in the polymer backbone as a measure of the short chain branching level in the polymer. One measure of the molecular weight distribution, $M_w/M_n$, is also provided in Table 2. Table 2 illustrates that the SCB was restricted to either the high molecular weight component for the inventive resin compositions, or to the low molecular weight component for the comparative resin compositions.

TABLE 2

Representative individual polymer components used to prepare the polymer blends of the present invention.

| Component ID | HLMI or MI (dg/min) | $M_w$ (kg/mol) | $M_w/M_n$ | $M_z/M_w$ | SCB/1000 Backbone Carbons |
|---|---|---|---|---|---|
| High Molecular Weight Component | | | | | |
| CP-1 | 0.31 | 369 | 2.9 | 2.1 | 5.6 |
| 516-1[§] | 0.55 | 446 | 4.5 | 3.4 | 3.2 |
| HP-1 | 0.32 | 398 | 2.9 | 2.1 | 0.0 |
| HP-2 | 0.05 | 550 | 2.5 | 2.0 | 0.0 |
| Low Molecular Weight Components | | | | | |
| LCP-1 | 130 (MI) | 34 | 2.0 | 1.6 | 4.7 |
| 516-2[†] | 90 (MI) | 45 | 5.3 | 5.4 | 0.0 |

[§]516-1 is the high molecular weight component of H516B.
[†]516-2 is the low molecular weight component of H516B and of the series-2 inventive resins.

TABLE 1

Representative preparative methods for some individual component polymers of the present invention.[†]

| Component | Metallocene* | Time (min) | Temp. (C.) | Pressure (psi) | 1-Hexene wt. (g) | Catalyst wt. (mg) | Solid PE (g) | MI dg/10 min | HLMI dg/10 min |
|---|---|---|---|---|---|---|---|---|---|
| CP-1 | A | 30 | 90 | 550 | 50 | 1 | 464 | 0 | 0.31 |
| HP-1 | A | 90 | 95 | 450 | 0 | 1 | 296 | 0 | 0.32 |
| HP-2 | A | 90 | 90 | 550 | 0 | 1 | 464 | 0 | 0.04 |
| LCP-1 | B | 35 | 90 | 550 | 25 | 1 | 548 | 130.5 | — |

[†]In all examples, reactions were conducted using 200 mg of fluorided silica-alumina activator-support (chemically-treated solid oxide), and 1 mL of 1 M triisobutyl aluminum (TIBA) cocatalyst.
*A = ($\eta^5$-indenyl)$_2$HfCl$_2$; B = Me$_2$Si(3-PrCp)$_2$ZrCl$_2$.

Example 3

Representative Polymer Blend Compositions

Representative polymer blends of the present invention, both inventive and comparative, are illustrated in Table 3. The inventive compositions of this invention are the polymer blend compositions labeled as series-2. Accordingly, the properties of the series-2 blends are compared herein to those of the other blends as well as those of the H516B. The H516B resin is a conventional PE100 pipe grade HDPE produced by Chevron Phillips Chemical Company, which is a blend of two broad MWD, Ziegler-Natta-based polyethylenes.

The high molecular weight components (HP-1, HP-2, and CP-1) were blended with the low molecular weight components (LCP-1 and 516-2) to create a series of blends that allow the influence exerted by the targeted placement of SCB in the ultimate blend to be examined. These blends are described in Table 3, and are labeled as series-1, series-2 and series-3. The comparative polymer blends are the series-1 and series-3 blends and these blends contain SCB only along the low end of the MWD, with series-3 being a relatively higher molecular weight collection of blends. While the molecular weight characteristics of the inventive series-2 blends were verified to be similar to their series-1 counterparts, the SCB was placed along the longer molecules in series-2 blends.

TABLE 3

Representative polymer blend compositions of the present invention and compositions of comparative polymer blends.

| BLEND NO. | COMPONENTS A/B | WEIGHT RATIO A/B |
|---|---|---|
| series-1: Comparative | | |
| BM1-1 | HP-1/LCP-1 | 52/48 |
| BM1-2 | HP-1/LCP-1 | 60/40 |
| BM1-3 | HP-1/LCP-1 | 68/32 |
| series-2: Inventive | | |
| BM2-1 | CP-1/516-2 | 52/48 |
| BM2-2 | CP-1/516-2 | 60/40 |
| BM2-3 | CP-1/516-2 | 68/32 |
| series-3: Comparative | | |
| BM3-1 | HP-2/LCP-1 | 52/48 |
| BM3-2 | HP-2/LCP-1 | 60/40 |

Example 4

Molecular Weight and Rheological Characteristics of Representative Inventive and Comparative Polymer Blends of the Present Invention As illustrated in Table 4, molecular weight and shear rheological characteristics of the inventive polymer blends of the present invention and of the comparative polymer blends, including H516B, were measured and are provided.

TABLE 4

Molecular weight and shear rheological characteristics of the inventive polymer blends of the present invention and of the comparative polymer blends, including H516B.

| Sample ID | $M_w$ (kg/mol) | $M_w/M_n$ | $M_z/M_w$ | $\eta_0$ (Pa·s) | $\tau_\eta$ (s) | a |
|---|---|---|---|---|---|---|
| series-1: Comparative | | | | | | |
| BM1-1 | 230 | 6.7 | 3.8 | 50200 | 0.4 | 0.57 |
| BM1-2 | 245 | 6.6 | 3.1 | 89100 | 0.5 | 0.57 |
| BM1-3 | 265 | 6.1 | 2.8 | 321000 | 1.3 | 0.39 |
| series-2: Inventive | | | | | | |
| BM2-1 | 242 | 15.7 | 3.6 | 64900 | 0.4 | 0.54 |
| BM2-2 | 242 | 12.4 | 3.6 | 98800 | 0.5 | 0.56 |
| BM2-3 | 276 | 11.1 | 2.9 | 318000 | 1.21 | 0.41 |
| series-3: Comparative | | | | | | |
| BM3-1 | 276 | 11.9 | 4.4 | 151000 | 1.1 | 0.60 |
| BM3-2 | 345 | 8.8 | 3.2 | 241000 | 1.3 | 0.62 |
| Comparative | | | | | | |
| H516B | 280 | 18.0 | 5.8 | 192000 | 1.3 | 0.35 |

Example 5

Density, RT Charpy, and PENT Properties of Representative Inventive and Comparative Polymer Blends of the Present Invention As illustrated in Table 5, the polymer compositions of this invention provided a useful combination of polyolefin properties such as polydispersity, long chain branching, rheological properties, and the like, that afford high performance materials, as indicated by measures such as Charpy impact toughness and high-stress PENT slow crack growth resistance values. These properties made these resins suitable for, among other uses, pressure pipe applications.

As seen in Table 5, the Razor-Notched Room-Temperature Charpy Energy and the High-Stress PENT (standard PENT at a 3.8 MPa initial loading) for the polymer blends of the present invention are superior to those of the other blends shown. Further, these performance measures of the polymers of this invention are also superior to those of the H516B resin.

TABLE 5

Representative physical properties of the inventive and comparative polymer blends of the present invention, including H516B, that are pertinent to pressure-pipe applications.

| Resin/Blend ID | Density (g/cc) | RT Charpy (J) | PENT (hrs; @ 3.8 MPa) |
|---|---|---|---|
| Inventive Polymer Blends | | | |
| BM2-1 | 0.9502 | 2.31 | >6000 |
| BM2-2 | 0.9445 | 2.44 | >6000 |
| BM2-3 | 0.940 | 2.64 | >6000 |
| Comparative Polymer Blends | | | |
| BM1-1 | 0.9507 | 0.31 | 0.05 |
| BM1-2 | 0.9502 | 1.54 | 0.30 |
| BM1-3 | 0.9490 | 2.19 | 0.65 |
| BM3-1 | 0.9485 | 0.68 | 0.45 |
| BM3-2 | 0.9470 | 2.55 | 1.10 |
| H516B (with carbon black) | 0.9605 | 0.60-2.20 | 300-600 |

Example 6

Non-Isothermal Melt Crystallization Characteristics of Representative Inventive and Comparative Polymer Blends of the Present Invention The non-isothermal melt crystallization characteristics of the subject blends were examined by cooling the blends from 170° C. to 0° C. at various rates in a DSC instrument. The location of the crystallization exotherm shifted to lower temperatures at higher cooling rates, due to kinetic effects. The slope of the exotherm peak location versus cooling rate averages –0.27 for the series-1 and series-3 blends. However, the same slope for series-2 blends is –0.21. While not intending to be bound by theory, this observation suggested that the non-isothermal melt-crystallization kinetics were influenced by the SCB distribution profile, with the crystallization rate being less sensitive to the cooling rate for those blends with SCB located along the longer molecules. The melting characteristics of the above non-isothermally crystallized specimens were characterized as well. The peak melting point ($T_m$) of the non-isothermally crystallized specimens decreased with increasing cooling rate. At high cooling rates (large undercoolings), relatively less-perfect crystals were formed that eventually melted at lower temperatures. For a given cooling history, $T_m$ decreased with increasing molecular weight. Further, for a given thermal history, MWD, and average SCB content, the $T_m$ was lower for those polymers in which the SCB was located on the longer molecules. Again, while not intending to be bound by theory, these $T_m$ results were attributed to trends in lamellar thickness.

Non-isothermal crystallization data was also analyzed in terms of the degree of undercooling $\Delta T_c$ defined as the temperature difference between $T_m$ in the subsequent heating scan and the temperature at the onset of crystallization, $T_b$. The variation of $\Delta T_c$ with cooling rate, $\chi$, was fitted to the following equation:

$$\Delta T_c = P\chi + \Delta T_c^0$$

where, $\Delta T_c^0$ is the degree of undercooling required in the limit of zero cooling rate and is related to the thermodynamic driving force for nucleation, and the slope, P is a process sensitivity factor that accounts for the kinetic effects. Thus, $\Delta T_c^0$ for all the blends was observed to be within a 3° C. window. The parameter P was observed to be smaller for series-2 blends relative to series-1 and series-3 blends. While not bound by theory, this observation appears to confirm the results that indicate a lesser sensitivity to process history for those polymers with SCB present along the longer molecules.

Example 7

Isothermal Crystallization Characteristics of Representative Inventive and Comparative Polymer Blends of the Present Invention The isothermal crystallization characteristics of these blends were also investigated. The crystallization exotherms, in general, became broader and its location shifted to longer times at higher temperatures. Further, the enthalpy of crystallization also decreased slightly with increasing temperature. The peak location ($t_{peak}$) of the isothermal crystallization exotherms is plotted as a function of crystallization temperature for all the blends in FIG. 2. As can be seen, $t_{peak}$ increased exponentially with increasing temperature for all the blends; however, this dependence (slope) was much greater for inventive series-2 blends. In general, this slope increased with increasing molecular weight for each blend series indicating slower crystallization kinetics for longer molecules. Further, it was clear that this slope was significantly larger for the series-2 blends. For instance, despite the similar molecular weight, MWD, shear rheology and average SCB content for blends BM1-1 and BM2-1, the crystallization kinetics of BM2-1 were substantially slower. While not intending to be bound by theory, it is likely that the placement of SCB on the longer molecules makes them more sluggish from a crystallization perspective.

Figure 2:
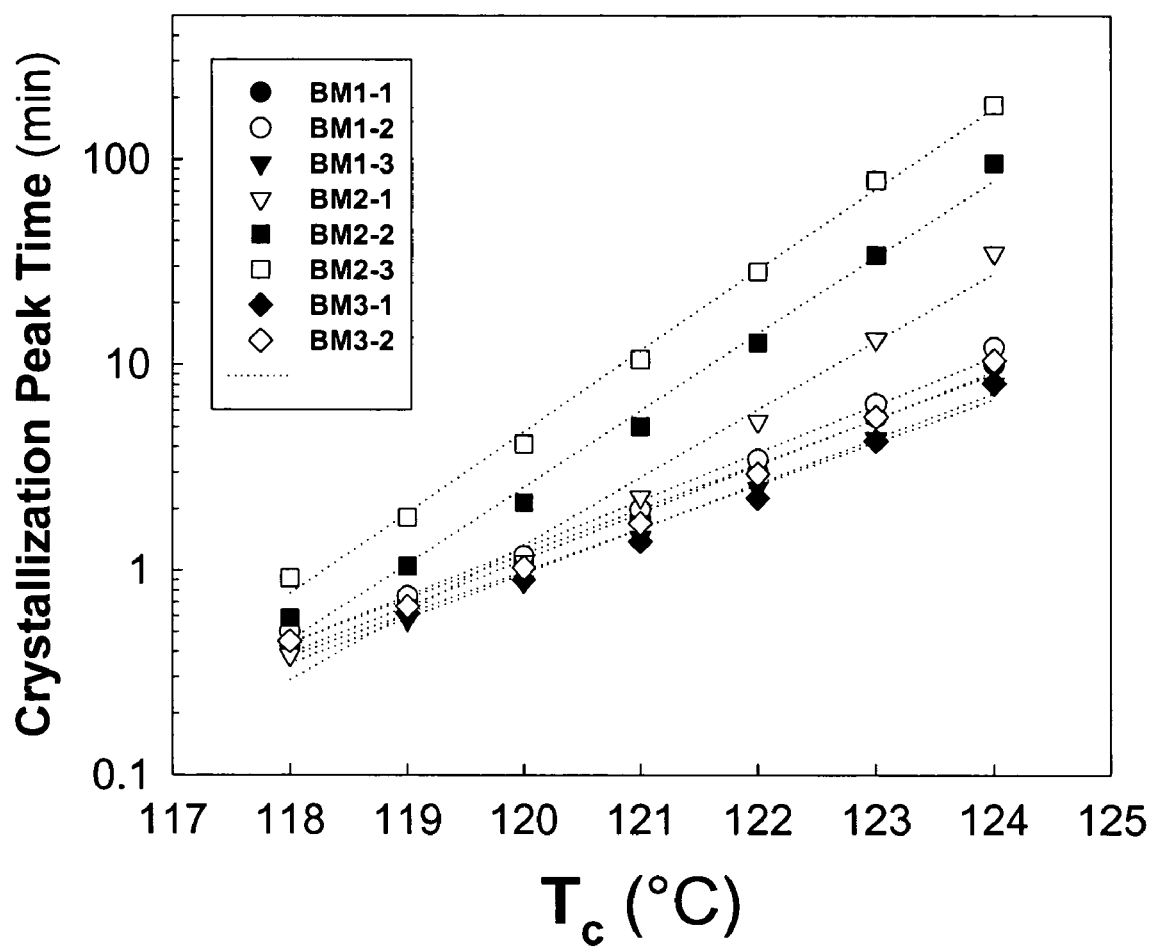
FIG. 2 is a comparative graph illustrating the peak location ($t_{peak}$) of the isothermal crystallization exotherms with respect to crystallization temperature for both inventive and comparative polymer blends.
Figure 3:
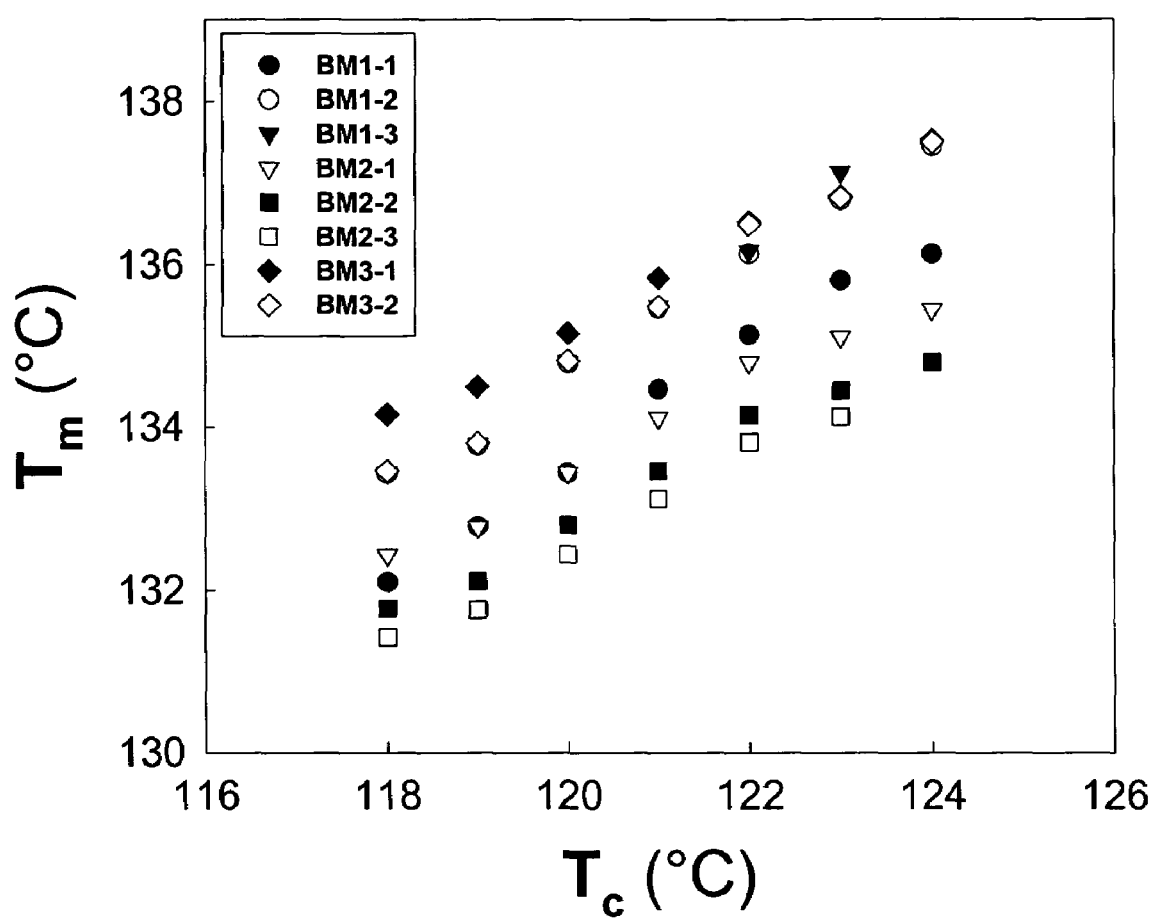
FIG. 3 is a plot of the peak melting point ($T_m$) plotted as a function of the crystallization temperature for both inventive and comparative polymer blends.

The above isothermally crystallized specimens were subsequently heated from the isothermal crystallization temperature to capture the melting transition. FIG. 2 shows the peak melting point ($T_m$) plotted as a function of the crystallization temperature for all the blends. A systematic increase in $T_m$ with increasing crystallization temperature is clearly evident in FIG. 2. While not intending to be bound by theory, it is likely that, thicker and more perfect lamellar crystals formed at higher temperatures (lower undercooling), which translated to higher observed melting points. For a given thermal history, $T_m$ for series-2 blends was consistently lower than that of either series-1 or series-3 blends, even though these blends were fairly matched in terms of their MWD and average SCB content.

Further, for the comparative series-1 and series-3 blends, $T_m$ increased with increasing molecular weight. As $T_m$ is primarily a function of the average thickness of the lamellar crystals present, and again while not intending to be bound by theory, the increasing $T_m$ with molecular weight for series-1 and series-3 blends can be explained in terms of fewer interruptions during the crystallization process of long, linear molecules. Series-2 blends, however, with SCB along the longest molecules, likely experience many interruptions during the crystallization process. While again not intending to be bound by theory, it is thought that these SCB that have to be excluded from the crystal lattice interrupt the crystal thickening process, thus lowering the average lamellar thickness. Possibly, this interruption is also likely responsible for the slower crystallization kinetics of molecules with SCB.

Example 8

Figure 4:
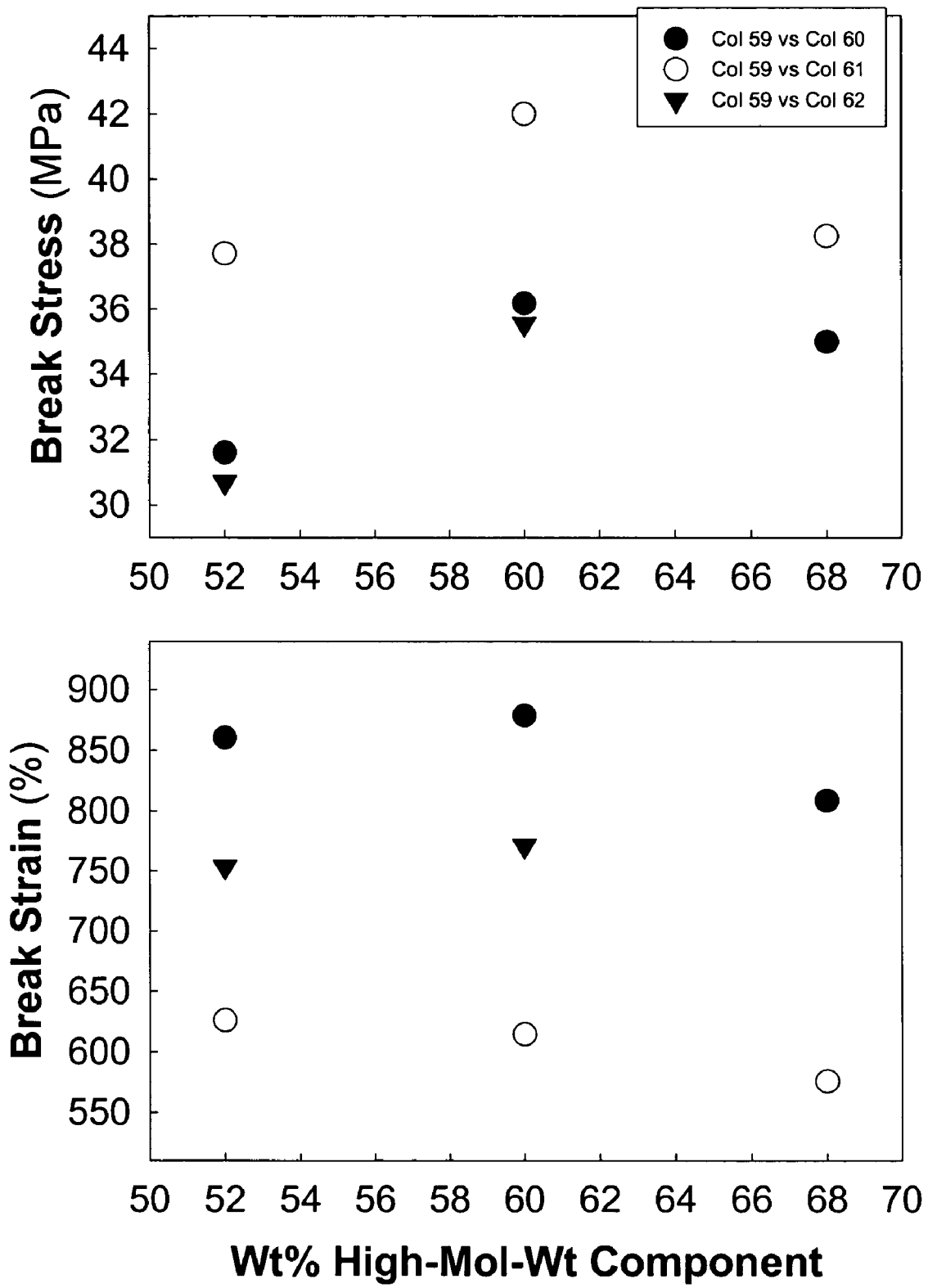
FIG. 4 provides a comparative graph of the break stress and strain for both inventive and comparative polymer blends, with respect to composition.

Tensile Properties of Representative Inventive and Comparative Polymer Blends of the Present Invention The tensile properties of the subject blends were investigated using compression-molded plaques from which dog-bone specimens were stamped out. The instantaneous tensile properties, namely modulus, yield stress and yield strain were found to be dependent almost entirely on density or crystallinity. The ultimate properties (break stress and strain) are known to depend on both crystallinity and molecular weight. Demonstrated here is the influence exerted by SCB distribution on the ultimate tensile properties of PE. FIG. 4 shows the break stress and strain for the blends plotted as a function of composition. The break stress increases somewhat with molecular weight initially; however, at the highest molecular weight in each series, the break stress decreases somewhat. While not intending to be bound by theory, this maxima in the break stress versus blend composition may be attributed to competing effects between molecular weight and crystallinity. An interesting feature to note is that the break stress for series-2 blends is consistently and substantially higher than that of series-1 and series-3 blends despite the similarities in the MWD and average SCB content. It is also important to note that the break stress for series-2 blends is substantially higher even though they are, on average, less crystalline compared to their counterparts in the other two blend sets. While the break stress for series-2 blends is high, their break strain is consistently and considerably lower than that of the other blends. Therefore, the ultimate tensile properties are found to depend strongly on the SCB distribution profile. The location of SCB along the longer molecules slows the crystallization kinetics and consequently increases the tie-molecule concentration sufficiently such that the semi-crystalline structure allows the ability to sustain substantially higher levels of stress prior to breakage. In other words, placing a few SCB on the longest molecules of a PE produces the tensile traits of a significantly higher molecular weight polymer, all else being equal. Further, despite the crystallinity and molecular weight differences between the three blend series, SCB distribution appears to exert the strongest influence on the ultimate tensile properties of PE.

Figure 5:
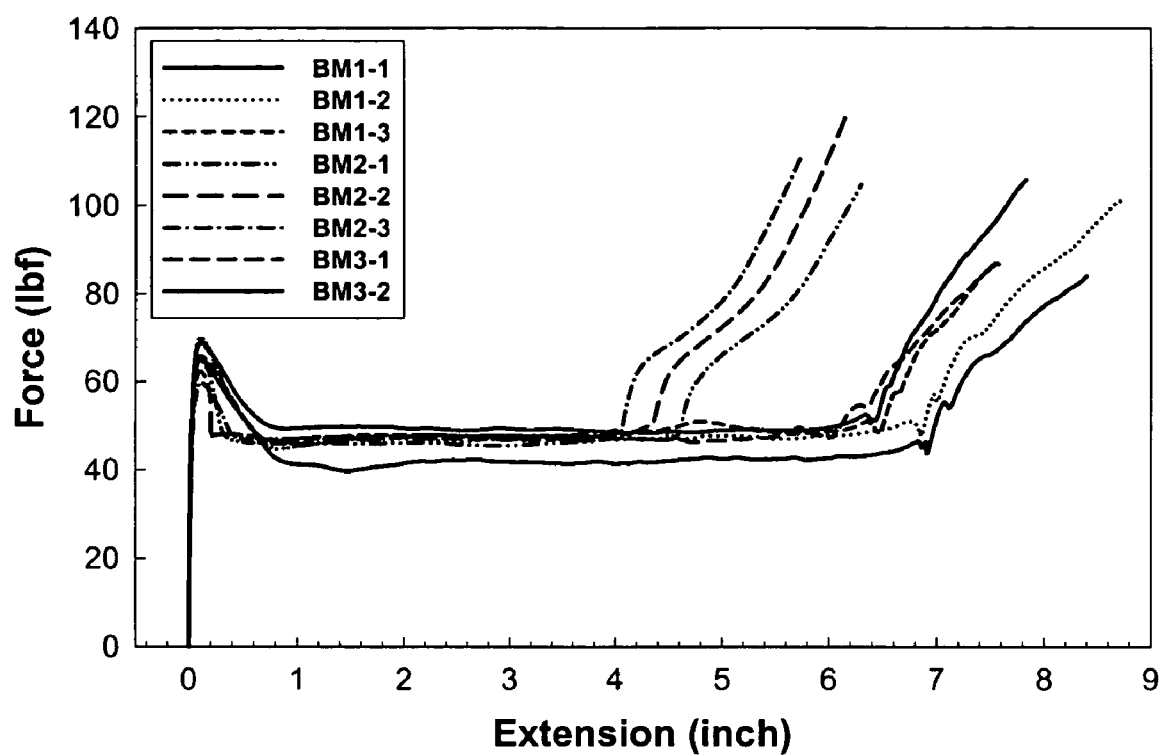
FIG. 5 is a plot of the raw tensile curves for both inventive and comparative polymer blends of this invention, plotted as load versus extension.

FIG. 5 shows the raw tensile curves, plotted as load versus extension. Following the linear elastic region at low strain, a peak in the load is evident in the vicinity of the yield point. The load drops after the yield and a plateau in the load follows. During this plateau, the material is likely undergoing post-yield non-recoverable deformations that involves destruction and re-formation of the lamellar crystals. At sufficiently high strains, a distinct increase in the slope of the load-displacement curve is clearly evident. This increase in slope is usually associated with the onset of "strain-hardening". The extension at which strain-hardening begins to occur is noted to depend distinctly on the SCB distribution across the MWD of the polymer. Specifically, the onset of strain-hardening occurs at significantly lower extensions for those polyethylenes with SCB located on the longer chains. Further, the onset of strain-hardening is also noted to occur at slightly lower extensions with increasing molecular weight. Thus, the ability of series-2 blends to sustain higher loads prior to failure is noted to be a consequence of the earlier onset of strain-hardening. While this onset of strain-hardening, also referred to as the natural draw-ratio, has been reported to influence the load-bearing capability of polymeric products, one aspect of this invention is the relationship between the strain-hardening character of PE and molecular architecture.

Example 9

Ductile-Brittle Transition Temperature ($T_{db}$) Measurements of Resins

The razor-notched Charpy impact energy measured at room-temperature provides a good measurement of the inherent fracture toughness of a polymer. The same Charpy test (ASTM F2231) was performed at multiple temperatures, because when the temperature is sufficiently low, the specimen failure mode will change from "ductile" to "brittle". The temperature at which this failure mode change occurs is referred to as the ductile-brittle transition temperature ($T_{db}$). The $T_{db}$ is another physical property relevant for pressure pipe applications, where lower $T_{db}$ is desirable. Table 6 illustrates the $T_{db}$ data for the inventive and comparative compositions.

TABLE 6

Ductile-brittle transition temperature ($T_{db}$) measurements of inventive and comparative polymer blends.

| BLEND NO. | $T_{db}$ (° C.) |
|---|---|
| Inventive Blend BM2-1 | <−30 |
| Comparative Blend BM1-1 | −18 |
| H516B | −29 |

We claim:
1. A composition comprising:
   a) a high molecular weight component comprising an ethylene copolymer characterized by a $M_w/M_n$ less than or equal to about 3.5, a substantially constant short-chain branching (SCB) profile across the molecular weight distribution, and a number of shod-chain branches (SCB) per 1000 backbone carbon atoms from about 4 to about 8; and
   b) a low molecular weight component comprising an ethylene homopolymer characterized by a $M_w$ from 25 to 60 kg/mol.
2. The composition of claim 1, wherein the ethylene copolymer of the high molecular weight component is further characterized by a $M_w$ in a range from about 250 to about 1,000 kg/mol.
3. The composition of claim 1, wherein the ethylene copolymer of the high molecular weight component is further characterized by a $M_w$ in a range from about 275 to about 800 kg/mol.
4. The composition of claim 1, wherein the ethylene copolymer of the high molecular weight component is further characterized by a $M_w$ in a range from about 300 to about 600 kg/mol.
5. The composition of claim 1, wherein the number of short-chain branches (SCB) per 1000 backbone carbon atoms is from about 5 to about 7.
6. The composition of claim 1, wherein the number of short-chain branches (SCB) per 1000 backbone carbon atoms is about 6.
7. The composition of claim 1, wherein the composition comprises from about 45 to about 75 parts by weight high molecular weight component and from about 55 to about 25 parts by weight low molecular weight component.
8. The composition of claim 1, wherein the composition comprises from about 50 to about 60 parts by weight high molecular weight component and from about 50 to about 40 parts by weight low molecular weight component.
9. The composition of claim 1, wherein the high molecular weight component comprises a copolymer of ethylene and a mono-1-olefin co-monomer having from 3 to about 12 carbon atoms.
10. The composition of claim 1, wherein the ethylene copolymer of the high molecular weight component is further characterized by a $M_z/M_w$ less than or equal to about 2.5.
11. The composition of claim 1, wherein the ethylene copolymer of the high molecular weight component is characterized by a number of short-chain branches (SCB) per 1000 backbone carbon atoms from about 5 to about 7, in a molecular weight range from about 300 to about 600 kg/mol.
12. The composition of claim 1, wherein the ethylene homopolymer of the low molecular weight component is characterized by a $M_w$ from about 30 to about 50 kg/mol.
13. The composition of claim 1, wherein the composition is further characterized by low levels of rheologically significant long branches.

14. The composition of claim 1, wherein the composition is characterized by a $M_z/M_w$ less than or equal to about 10.

15. The composition of claim 1, wherein the composition is characterized by a $M_z/M_w$ less than or equal to about 5.

16. The composition of claim 1, further characterized by a room temperature Charpy impact toughness greater than about 1.5 J, and a density greater than or equal to about 0.94 g/cc.

17. The composition of claim 1, further characterized by a room temperature Charpy impact toughness greater than about 2 J, and a density greater than or equal to about 0.94 g/cc.

18. The composition of claim 1, further characterized by a high-stress PENT value at a 3.8 MPa initial loading greater than or equal to about 1000 hours.

19. The composition of claim 1, further characterized by a high-stress PENT value at a 3.8 MPa initial loading greater than or equal to about 3000 hours.

20. The composition of claim 1, further characterized by a high-stress PENT value at a 3.8 MPa initial loading greater than or equal to about 5000 hours.

21. The composition of claim 1, further characterized by a high-stress PENT at a 3.8 MPa initial loading greater than or equal to about 6000 hours.

22. The composition of claim 1, further characterized by a high-stress PENT at a 3.8 MPa initial loading greater than or equal to about 6000 hours and a density greater than or equal to about 0.94 g/cc.

23. The composition of claim 1, further characterized by a Charpy impact toughness greater than about 2 J, and a high-stress PENT value at a 3.8 MPa initial loading greater than or equal to about 6000 hours.

24. The composition of claim 1, further characterized by an $\eta_0$ less than or equal to about $1.5 \times 10^5$ Pa-sec.

25. The composition of claim 1, further characterized by an $\eta_0$ less than or equal to about $1 \times 10^5$ Pa-sec.

26. An article comprising the composition of claim 1.

27. An article comprising the composition of claim 1, wherein the article is selected from a pipe, a container, a utensil; a film a film product, a drum, a fuel tank, a geomembrane, or a liner.

28. A PE-100 pipe comprising the composition according to claim 1.

29. A composition comprising:
    a) a high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from 5 to about 8; and
    b) a low molecular weight component comprising an ethylene homopolymer or copolymer characterized by a $M_w$ from 25 to 60 kg/mol.

30. The composition of claim 29, wherein the composition comprises from about 45 to about 75 parts by weight high molecular weight component and from about 55 to about 25 parts by weight low molecular weight component.

31. An article comprising the composition of claim 29.

32. An article comprising the composition of claim 29, wherein the article is selected from a pipe, a container, a utensil, a film, a film product, a drum, a fuel tank, a geomembrane, or a liner.

33. A PE-100 pipe comprising the composition according to claim 29.

34. A composition comprising:
    a) a high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from about 4 to about 8; and
    b) a low molecular weight component comprising an ethylene homopolymer or copolymer characterized by a $M_w$ from 25 to 60 kg/mol and a $M_w/M_n$ greater than or equal to 5.

35. The composition of claim 34, wherein the composition comprises from about 45 to about 75 parts by weight high molecular weight component and from about 55 to about 25 parts by weight low molecular weight component.

36. An article comprising the composition of claim 34.

37. An article comprising the composition of claim 34, wherein the article is selected from a pipe, a container, a utensil, a film, a film product, a drum, a fuel tank, a geomembrane, or a liner.

38. A PE-100 pipe comprising the composition according to claim 34.

39. A composition comprising:
    a) a high molecular weight component comprising an ethylene copolymer characterized by a $M_w/M_n$ less than or equal to about 3.5, a substantially constant short-chain branching (SCB) profile across the molecular weight distribution, and a number of short-chain branches (SCB) per 1000 backbone carbon atoms from about 4 to about 8; and
    b) a low molecular weight component comprising an ethylene homopolymer or copolymer characterized by a $M_w$ from 25 to 60 kg/mol, and substantially zero short-chain branches (SCB) per 1000 backbone carbon atoms.

40. The composition of claim 39, wherein the composition comprises from about 45 to about 75 parts by weight high molecular weight component and from about 55 to about 25 parts by weight low molecular weight component.

41. An article comprising the composition of claim 39.

42. An article comprising the composition of claim 39, wherein the article is selected from a pipe, a container, a utensil, a film, a film product, a drum, a fuel tank, a geomembrane, or a liner.

43. A PE-100 pipe comprising the composition according to claim 39.

* * * * *